United States Patent [19]

Child et al.

[11] 4,052,176
[45] Oct. 4, 1977

[54] PRODUCTION OF PURIFIED SYNTHESIS GAS $H_2$-RICH GAS, AND BY-PRODUCT $CO_2$-RICH GAS

[75] Inventors: Edward T. Child, Tarrytown, N.Y.; Warren G. Schlinger, Pasadena; George N. Richter, San Marino, both of Calif.

[73] Assignee: Texaco Inc., New York, N.Y.

[21] Appl. No.: 617,630

[22] Filed: Sept. 29, 1975

[51] Int. Cl.² .................. B01D 53/04; B01D 53/14
[52] U.S. Cl. .......................................... 55/32; 55/48; 55/70; 55/73
[58] Field of Search .................. 55/32, 46, 48, 51, 52, 55/68, 70, 73

[56] References Cited

U.S. PATENT DOCUMENTS

| | | | |
|---|---|---|---|
| 3,001,373 | 9/1961 | Eastman et al. | 55/68 X |
| 3,435,590 | 4/1969 | Smith | 55/48 X |
| 3,531,917 | 10/1970 | Grunewald et al. | 55/73 X |
| 3,656,275 | 4/1972 | Hunter | 55/73 X |
| 3,710,546 | 1/1973 | Grunewald et al. | 55/73 X |
| 3,767,766 | 10/1973 | Tjoa et al. | 55/73 X |
| 3,811,501 | 5/1974 | Burnett et al. | 166/252 |
| 3,864,460 | 2/1975 | Connell | 55/73 X |
| 3,910,777 | 10/1975 | Jakob | 55/48 |

OTHER PUBLICATIONS

Kirk–Othmer, Encyclopedia of Chemical Technology, 2nd Ed., vol. 4, 1964, pp. 431, 432, 438 and 439.

Primary Examiner—Thomas G. Wyse
Assistant Examiner—Robert H. Spitzer
Attorney, Agent, or Firm—Thomas H. Whaley; Carl G. Ries; Albert Brent

[57] ABSTRACT

A raw synthesis gas feed stream, e.g., gaseous mixtures comprising $H_2$ and CO and containing gaseous impurities including $CO_2$, $H_2S$, COS, and mixtures thereof (acid gas) and $CH_4$, optionally in admixture with a CO-rich gas stream produced subsequently in the process, is introduced into a water-gas shift reactor to produce $H_2$ and $CO_2$. Acid gases are then removed to produce a stream of purified synthesis gas by contacting the process gas stream with a first liquid solvent absorbent such as methanol, N-methyl-pyrrolidone, or dimethyl ether of polyethylene glycol. An $H_2$-rich gas stream may be obtained by removing CO from the purified synthesis gas stream. This may be done by physical absorption in a second liquid solvent absorbent comprising an aqueous solution of cuprous ammonium acetate. By regenerating the second liquid solvent, the aforesaid CO-rich stream may be produced. The first liquid solvent absorbent may be desorbed of said acid gas and regenerated for reuse by such techniques as flashing plus reboiling or stripping. Advantageously, the gas used for stripping the first liquid solvent absorbent may be a portion of the synthesis gas feed either before or after removal of said acid-gas, or a portion of said $H_2$-rich product gas. The $CO_2$-rich gas optionally in admixture with stripping gas which is produced during the regeneration of said first liquid solvent absorbent may be injected into a subterranean oil reservoir to effect secondary or tertiary recovery of oil. Optionally, $H_2S$ may be in admixture with said $CO_2$-rich gas mixture.

19 Claims, 1 Drawing Figure

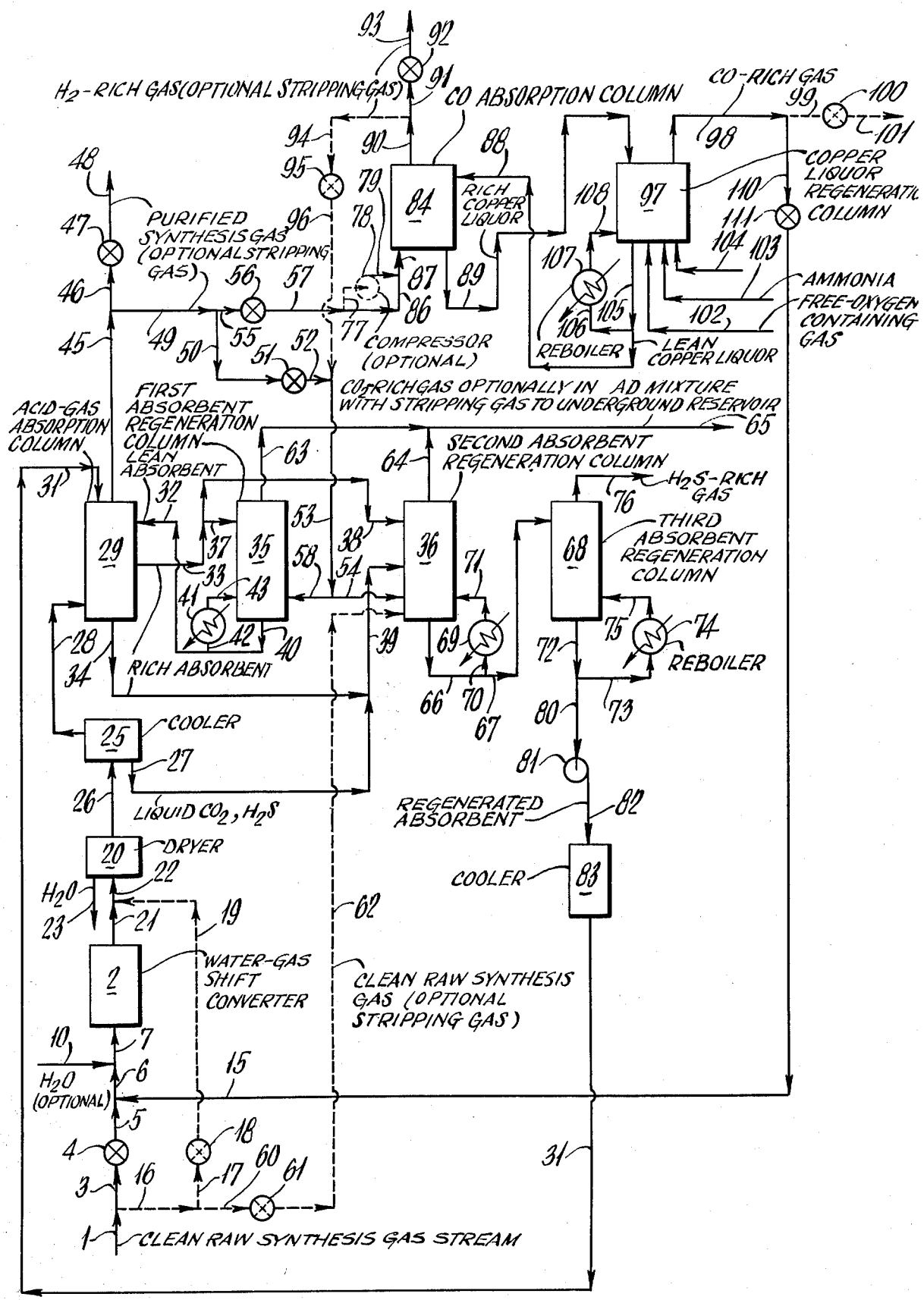

PRODUCTION OF PURIFIED SYNTHESIS GAS H$_2$-RICH GAS, AND BY-PRODUCT CO$_2$-RICH GAS

BACKGROUND OF THE INVENTION

1. Field of the Invention

This invention relates to a continuous process for the production of purified synthesis gas or hydrogen-rich gas with the concurrent production of a CO$_2$-rich gas suitable for injection into an underground oil reservoir to effect secondary recovery of oil.

2. Description of the Prior Art

Carbon dioxide has been removed from shifted synthesis gas by treating the synthesis gas with liquid solvent absorbents such as described in Industrial and Engineering Chemistry pages 37–43 July 1970, Vol. 62 No. 7 for the Rectisol Process (Lurgi-Linde) and the Purisol Process (Lurgi), and in Hydrocarbon Processing, page 100, April 1973, Vol. 52, No. 4 for the Selexol process (Allied Chemical Corporation). In said processes, nitrogen stripping gas is passed through the CO$_2$-saturated liquid solvent absorbent to regenerate the solvent. In such case, the CO$_2$ off-gas from the stripping vessel would contain about 17 per cent nitrogen. In contrast, there is no stripping of solvents with nitrogen in the present invention. By the subject process there are produced a purified mixture of H$_2$ and CO, a hydrogen-rich gas stream, and a CO$_2$-rich gas stream.

Carbon dioxide plus an inert gas is used for recovering oil from a spent oil reservoir by establishing miscibility conditions in the reservoir in coassigned U.S. Pat. No. 3,811,501.

Copper-liquor scrubbing of mixtures of H$_2$ and CO to remove CO is described in Kirk-Othmer, Encyclopedia of Chemical Technology 2d. ed. Vol. 4. Interscience Publishers, New York, 1964.

SUMMARY

The subject process relates to a continuous process for purifying a raw synthesis gas stream comprising H$_2$, CO, CO$_2$, H$_2$O, H$_2$S, COS, particulate carbon and optionally CH$_4$, N$_2$, and A. For example, by the subject process, the effluent gas stream produced by the partial oxidation of a hydrocarbonaceous feed in a gas generator is purified to produce a stream of purified synthesis gas, a stream of H$_2$-rich gas, and a stream of CO$_2$-rich gas. A portion of the synthesis gas or the H$_2$-rich gas, or both may be used as stripping gas in the solvent regeneration step. The CO$_2$-rich gas optionally in admixture with H$_2$S, stripping gas, or both may be injected into an underground oil reservoir for secondary recovery of petroleum from the reservoir. Preferably, a CO-rich gas stream recovered in the process is subjected to water-gas shift in order to produce additional H$_2$ and CO$_2$.

The following steps are included in the process: (1) cleaning said raw synthesis gas stream by removing said particulate carbon therefrom in a gas scrubbing zone; (2) introducing the clean gas stream from (1) into a water-gas shift conversion zone, optionally in admixture with a CO-rich gas stream, or supplemental H$_2$O, or both; and reacting together CO and H$_2$O in said shift conversion zone to produce additional H$_2$ and CO$_2$; (3) cooling and drying the gas stream from (2) and separating the process gas stream in a first separating zone into the following separate streams: (a) H$_2$O, (b) CO$_2$-rich gas optionally in admixture with stripping gas, (c) H$_2$S-rich gas, or optionally in place of (b) and (c) a gas mixture comprising (d) CO$_2$-rich gas and H$_2$S-rich gas optionally in admixture with stripping gas, and (e) a mixture of the H$_2$ and CO optionally in admixture with a gas from the group CH$_4$, N$_2$, A, and mixtures thereof; and where in said first separating zone acid gas is removed from the process gas stream by contacting said process gas stream in an acid-gas absorption column with a first liquid solvent absorbent to produce a rich first liquid solvent absorbent; (4) regenerating said rich first liquid solvent absorbent in a first liquid solvent regenerating zone to produce a stream of lean first liquid solvent absorbent by flashing plus reboiling or stripping with a stripping gas selected from the group: (a) a portion of raw synthesis gas, (b) a portion of the mixture comprising H$_2$ and CO in (3)(e), (c) a portion of H$_2$-rich gas stream obtained in a second separating zone by separating a CO-rich gas stream from the gaseous mixture (3) (e), and (d) mixtures of (a), (b) and (c); (5) optionally recycling said CO-rich gas stream to said water-gas shift conversion zone (1); and (6) recycling said lean first liquid solvent absorbent to said acid-gas absorption column.

A nitrogen-free gaseous stream comprising said CO$_2$-rich gas optionally in admixture with H$_2$S-rich gas, or a stripping gas, or both (see step (3) (b) or (d) above) may be injected into subterranean oil reservoirs to promote the recovery of oil.

DESCRIPTION OF THE INVENTION

Synthesis gas comprises gaseous mixtures of H$_2$, CO, CO$_2$, H$_2$O, particulate carbon, and at least one gas selected from the group CH$_4$, H$_2$S, COS, N$_2$, and A. Reducing gas comprises substantially the same constituents as synthesis gas, but the amount of H$_2$O and CO$_2$ present is generally reduced. Fuel gas is rich in CH$_4$ and may contain H$_2$, CO, and some of the other gaseous constituents found in synthesis gas.

Synthesis gas, reducing gas, and fuel gas are preferably made by the partial oxidation of a hydrocarbonaceous fuel in a noncatalytic free-flow synthesis gas generator. For example, a pumpable slurry of coal or a liquid hydrocarbon fuel feedstock such as petroleum oil, is reacted with a free-oxygen containing gas such as substantially pure oxygen, oxygen-enriched air, or air optionally in the presence of a temperature moderator such as H$_2$O or CO$_2$ at an autogenously maintained temperature within the range of about 1300 to 3500° F and at a pressure in the range of about 3 to 250 atmospheres absolute.

Synthesis gas and reducing gas may be also made by catalytic steam reformation of liquid hydrocarbons such as naphtha. However, the cost of such feedstocks are greater than the cost of the feedstock used in the preferred partial oxidation process. Further, catalysts are expensive.

The gas generator for carrying out the partial oxidation reaction in the subject process preferably consists of a compact, unpacked, free-flow non-catalytic, refractory lined steel pressure vessel of the type described in coassigned U.S. Pat. No. 2,809,104 issued to D. M. Strasser et al, which patent is incorporated herewith by reference. The raw synthesis gas stream from the gas generator may have the following composition in mole %: H$_2$ 20 to 70: CO 60 to 15; CO$_2$ 3 to 30; H$_2$O 5–15; CH$_4$ nil to 20; N$_2$ nil to 60; H$_2$S nil to 5.0; COS nil to 0.2; A nil to 2; and from 0.2 to 20 wt. % of particulate carbon (basis weight of C in the hydrocarbonaceous fuel).

The free-oxygen containing gas may be selected from the group consisting of air, oxygen-enriched air (22 mole per cent $O_2$ and higher), and preferably substantially pure oxygen (95 mole per cent $O_2$ and higher). The amount of nitrogen in the product gas may be substantially reduced or eliminated by using substantially pure oxygen.

Preheating of the reactants is optional but generally desirable. For example, a hydrocarbon oil and steam may be preheated to a temperature in the range of about 100 to 800° F and the oxygen may be preheated to a temperature in the range of about 100 to 1000° F.

A wide variety of hydrocarbonaceous fuels is suitable as feedstock for the partial oxidation process, either alone or in combination with each other or with particulate carbon. The hydrocarbonaceous feeds include fossil fuels such as: various liquid hydrocarbon fuels including petroleum distillates and residua, naphtha, asphalt, gas oil, residual fuel, reduced crude, fuel oil, whole crude, coal tar, coal oil, shale oil, tar sand oil, and mixtures thereof. Suitable liquid hydrocarbon fuel feeds as used herein are by definition liquid hydrocarbonaceous fuel feeds that have a gravity in degrees API in the range of about −20 to 100.

Pumpable slurries of solid carbonaceous fuels, e.g., lignite, bituminous and anthracite coals, coal char, particulate carbon, petroleum coke, and mixtures thereof in water or in said liquid hydrocarbon fuels are included herewith as within the scope of the definition for hydrocarbonaceous fuel feeds.

Further, included also by definition as a hydrocarbonaceous fuel are liquid oxygenated hydrocarbonaceous materials, i.e., liquid hydrocarbon materials containing combined oxygen, including alcohols, ketones, aldehydes, organic acids, esters, ethers, and mixtures thereof. Further, a liquid oxygenated hydrocarbonaceous material may be in admixture with one of said liquid petroleum materials.

It is normal to produce from hydrocarbonaceous fuel feeds by partial oxidation about 0.2 to 20 weight percent of free carbon soot (on the basis of carbon in the hydrocarbonaceous fuel feed). The free carbon soot is produced in the reaction zone of the gas generator, for example, by cracking hydrocarbonaceous fuel feeds. Carbon soot will prevent damage to the refractory lining in the generator by constituents which are present as ash components in residual oils. With heavy crude or fuel oils, it is preferable to leave about 1 to 3 weight per cent of the carbon in the feed as free carbon soot in the product gas. With lighter distillate oils, progressively lower carbon soot yields are maintained.

The amount of soot in the product synthesis gas may be controlled primarily by regulating the oxygen to carbon ratio (O/C, atom/atom) in the range of 0.7 to 1.5 atoms of oxygen per atom of carbon in the feed and, to some extent by regulating the weight ratio of $H_2O$ to hydrocarbonaceous fuel feed in the range of 0.15 to 5.0 pounds of $H_2O$ per pound of fuel. In the above relationship, the O/C ratio is to be based upon (1) the total of free-oxygen atoms in the oxidant stream plus combined organic oxygen atoms in the hydrocarbonaceous fuel molecules and (2) the total of carbon atoms in the hydrocarbonaceous fuel feed plus carbon atoms in recycled particulate carbon (soot). For example, at a constant oil feed rate, the entire operating range of about 1 percent to about 4 percent soot yield may be obtained by only a 6 percent change in the oxygen feed rate.

$H_2O$ is preferably introduced into the reaction zone to help control the reaction temperature, to act as a dispersant of the hydrocarbonaceous fuel fed to the reaction zone, and to serve as a reactant to increase the relative amount of hydrogen produced. Other suitable temperature moderators include $CO_2$-rich gas, a cooled portion of effluent gas from the gas generator, cooled off-gas from an integrated ore-reduction zone, nitrogen, and mixtures thereof.

In one embodiment of our invention, the hot gaseous effluent from the reaction zone of the synthesis gas generator may be quickly cooled below the reaction temperature to a temperature in the range of about 180° to 700° F by direct quenching in water in a gas-liquid contacting or quenching zone. For example, the cooling water may be contained in a quench vessel or chamber located immediately downstream from the reaction zone of said gas generator. An interconnecting passage between the reaction zone and the quench zone through which the hot effluent gases may pass substantially equalizes the pressure in the two zones. Recycle water from the carbon recovery zone or lean carbon-water dispersion to be further described may be introduced through a spray ring at the top of the quench zone. Large quantities of steam are generated in the quench vessel and saturate the process gas stream. This may provide the additional steam required for subsequent water-gas shift reaction. For a detailed description of a quench chamber suitable for oil feeds see coassigned U.S. Pat. No. 2,896,927 issued to R. E. Nagle et al, which is herewith incorporated by reference.

Substantially all of the solids are scrubbed from the effluent gas. A dispersion of unconverted particulate carbon-ash and quench water is thereby produced. Any residual solids in the cooled and scrubbed effluent synthesis gas leaving the quench chamber may be removed by means of an additional water scrubbing in a conventional venturi or jet scrubber, such as described in Perry's Chemical Engineers Handbook, Fourth Edition, McGraw Hill Co., 1968, pages 18-55 to 56.

Noncombustible solid particles such as ash, slag, silt, metal constituents, and other solids which do not disperse in the quench water drop to the bottom of the quench vessel where they are periodically removed through a lock hopper system. This residue has some commercial value and may be used, for example, as a soil improver. For example, coal ash may be removed from the flanged exit port at the bottom of the quench tank by way of the lock hopper system. For each 100 pounds of raw ground coal fed to the gas generator, about 0 to 50 pounds of ash are produced. On a dry basis, the ash residue may comprise in wt. %: $SiO_2$ 10 to 60, $Al_2O_3$ 10 to 60, iron oxides and sulfides 0 to 40, and others.

Alternately, the hot effluent gas stream from the reaction zone of the synthesis gas generator may be cooled to a temperature in the range of about 240° to 700° F by indirect heat exchange in a waste heat boiler. The entrained solid particles may be then scrubbed from the effluent synthesis gas by contacting and further cooling the effluent stream of synthesis gas with quench water in a gas-liquid contact apparatus, for example, a quench dip-leg assembly, a spray tower, venturi, or jet scrubber, bubble plate contractor, packed column, or in a combination of said equipment. For a detailed description of cooling synthesis gas by means of a waste heat boiler and a scrubbing tower, reference is made to coassigned U. S. Pat. No. 2,980,523 issued to R. M. Dille et al and incorporated herewith by reference.

It is desirable to maintain the concentration of particulate carbon in the gas cooling and scrubbing water streams in the range of about 0.5 to 2 wt. % and preferably below about 1.5 wt. %. In this manner, the dispersion of carbon in water will be maintained sufficiently fluid for easy pumping through pipelines and for further processing. The temperature in the scrubbing zone is in the range of about 180° to 700° and preferably in the range of about 250°-550° F. The pressure in the scrubbing zone is in the range of about 1-250 atmospheres, and preferably at least 25 atmospheres. Suitably the pressure in the scrubbing zone is about the same as that in the gas generator, less ordinary pressure drop in the lines.

It is important with respect to the economics of the process that the particulate carbon be removed from the carbon-water dispersion and the resulting clear water to be recycled and reused for cooling and scrubbing additional particulate carbon from the effluent gas stream from the gas generator.

After the raw synthesis gas stream from the gas generator is passed through the scrubbing zone to remove particulate carbon and any other entrained solid particles, all or a portion may be mixed with supplemental $H_2O$ (if necessary) to provide a process gas stream having a mole ratio $H_2O/CO$ in the range of about 2 to 5. The process gas stream is preferably introduced into a conventional catalytic water-gas shift reaction zone where CO and $H_2O$ react at a temperature in the range of about 500° to 1050° F over a conventional water-gas shift catalyst to produce $H_2$ and $CO_2$. At least a portion of a CO-rich stream which may be separated from the process gas stream downstream in the process (to be further described) is optionally mixed with the cleaned raw effluent gas from the gas generator and introduced into the water-gas shift converter. A suitable water-gas shift catalyst may comprise iron oxide promoted by 1 to 15 weight percent of an oxide of a metal such as chromium, thorium, uranium, beryllium and antimony. Alternatively, cobalt molybdate on alumina may be used as the water-gas shift catalyst at a reaction temperature in the range of about 500° to 840° F. Co-Mo catalysts comprise in weight percent CoO 2-5, $MoO_3$ 8-16, MgO nil-20, and $Al_2O_3$ 59-85.

Next, by conventional means substantially all of the $H_2O$ and acid gas are removed from the process gas stream. For example, the clean process gas stream may be cooled to a temperature below the dew point of water by conventional means to condense out and separate $H_2O$. Next, the feedstream may be substantially dehydrated by contact with a desiccant such as alumina. The dry process gas stream may be then cooled to a temperature in the range of about −70° to −50° F to condense out and separate a liquid stream comprising from about 0 to 70 volume % of the $CO_2$, $H_2S$ and COS originally present, depending upon the pressure and the amount present in the raw gas.

Further purification of the process gas stream may be effected by any suitable conventional system employing physical absorption with a liquid solvent, e.g. cold methanol, N-methyl-pyrrolidone, and dimethyl ether of polyethylene glycol. A simplified system in which removal of the remaining $H_2S$, COS, $CO_2$, and $H_2O$ may be accomplished by physical absorption in cold methanol will be described below.

In a conventional liquid-gas absorption column, e.g. tray type, with methanol solvent, at a temperature in the range of about −20° to −70° F and a pressure in the range of about 25 to 150 atmospheres, about 10 to 20 standard cubic feet (SCF) of the partially purified process gas stream is contacted by each pound of cold methanol. Preferably, the pressure in the absorption column is the same as the pressure in the gas generator less ordinary drop in the lines and equipment.

For the following reasons, methanol is the preferred polar solvent that is used in the subject process for acid gas absorption. Methanol is a stable, readily available and inexpensive solvent. It has a low viscosity, and it is not affected by any trace components that may be present in the process gas stream. Corrosion is not a problem and its anti-freeze characteristics are beneficial. Further, methanol will remove any residual $H_2O$ and simultaneously dry the gas to pipeline standards.

In the subject physical absorption process, the solvent rate is inversely proportional to the pressure and to the solubility. Solubility is a function of temperature and the compositions of the solvent and of the gas mixture. Acid gases, e.g. $CO_2$, $H_2S$, and COS, are highly soluble in methanol at high pressures and low temperatures. Then, when the pressure is reduced and the temperature of the charged solvent raised, these gases may be readily stripped from the solvent without the costly steam requirement of conventional chemical-absorption methods. While some steam may be used, the actual quantity is substantially reduced.

The difference in solubility between $CO_2$ and the gaseous sulfur compounds in methanol and in most polar solvents makes it possible to selectively remove $H_2S$ and COS before $CO_2$ removal. Further, the $H_2S$ and COS may be concentrated into a fraction suitable for feeding a conventional Claus unit where elemental sulfur is produced. However, substantially all of the COS has been previously removed in the water-gas shift conversion zone.

The process gas stream leaving the acid-gas absorber is substantially free from $H_2S$, COS, $CO_2$, and $H_2O$. When the oxidant fed to the partial oxidation gas generator comprises 95 mole % or more of oxygen, this stream of purified synthesis gas has the following composition in mole %: $H_2$ 50 to 99; CO 1 to 50; $CH_4$ nil to 15; $N_2$ nil to 3; A nil to 2; $CO_2$ nil to 500 ppm; $H_2S$ nil to 5 ppm; and COS nil to 5 ppm. This gas stream may be used as synthesis gas, reducing gas, or fuel gas. Preferably, at least a portion of this gas stream may be used as stripping gas in the system, to be further described, for regenerating the liquid solvent absorbent charged with acid gas. Optionally, all or a portion of this clean, acid gas-free process gas stream may be subjected to further purification to provide a hydrogen-rich gas stream. Optionally, at least a portion of said $H_2$-rich gas stream may be used as said stripping gas.

The liquid solvent absorbent charged with acid gas leaving the acid-gas absorber may be regenerated by at least one and preferably a combination of the following conventional techniques: flashing, stripping, and boiling.

For example, the first step of a simplified system for regenerating charged or rich methanol provides for flashing off the $CO_2$ from the charged methanol absorbent stream taken from the middle of the absorber in a first regeneration column such as a conventional plate-type column equipped with a reboiler, and at a substantially reduced pressure. For example, the pressure may be reduced to about 25 psig. Regenerated methanol leaves from the bottom of the first absorbent regeneration column and is recycled to the acid-gas absorption column where it is introduced near the top. The gas leaving from the top of the first regeneration column carries with it substantially all of the $CO_2$ dissolved in the charged methanol and less than 5 parts per million of $H_2S$ and COS. Optionally, any hydrogen in the charged methanol may have been first flashed off and separated from the other dissolved gases by a step-wise reduction of pressure.

A portion of the liquid stream of rich methanol from the middle of said acid-gas absorber, the rich methanol from the bottom of the absorber, and all of said liquid mixture of $CO_2$, $H_2S$, and any COS in liquid phase from said cooling zone, are introduced into a second regeneration column equipped with a reboiler for stripping soluble gases from the rich methanol at a substantially lower pressure, e.g. about 15 to 30 psig. Alternately, a stripping gas may be preferably introduced into the bottom of the second regeneration column in countercurrent flow with the charged cold methanol. The ratio of pounds of rich methanol to standard cubic feet (SCF) of stripping gas may be in the range of about 0.1 to 2.0. When it is desired to obtain an $H_2S$-rich gas stream for producing sulfur in a Claus unit, the stripped methanol stream containing substantially all of the $H_2S$ leaving from the bottom of the second regeneration column may be introduced into a third absorbent regeneration column. Optionally, the third regeneration column may be eliminated and all of the $H_2S$ may be desorbed along with the $CO_2$-rich gas by boiling, or alternately stripping the rich first solvent absorbent in the second regeneration column.

The effluent gas leaving from the top of the second regeneration column may be mixed with the gas leaving from the top of the first regeneration column of similar composition. With pure oxygen gasification to produce the raw synthesis gas and with purified synthesis gas as the stripping gas, this $CO_2$-rich gas stream may have the following composition in mole %: $CO_2$ 70 to 95; $H_2$ nil to 20; $H_2S$ nil to less than 5 ppm; COS nil to less than 5 ppm; $N_2$ nil to 2.0; $CH_4$ nil to 5; and CO nil to 10.

The $CO_2$-rich gas stream from the first and second regenerators may be injected into underground spent oil reservoirs, for example, by way of at least one injection well, to effect secondary or tertiary recovery of oil, by, for example, gas repressuring. A mixture of recovered hydrocarbonaceous material, i.e. crude oil, along with water, and $CO_2$-rich gas are obtained from the subterranean reservoir by way of at least one production well. Optionally, the production well may be the injection well. These materials are then separated from each other in a separation zone by conventional means. The process cycle may be made continuous by introducing at least a portion of the hydrocarbonaceous fluid recovered into the gas generator as at least a portion of the hydrocarbonaceous feed. Also, the separated $CO_2$-rich gas may be recycled and injected underground. Alternately, the $CO_2$-rich gas may be injected into a producing oil reservoir to increase oil recovery by maintaining pressure during the primary producing life. This operation may supplement or prolong the natural gas drive displacement of the reservoir oil beyond that provided by the gas originally dissolved in or associated with the oil.

For example, to promote the production of crude oil from a subsurface oil reservoir to subterranean oil structure said $CO_2$-rich gas at a pressure in the range of about 1000 to 5000 psig is introduced by way of an injection well into said reservoir where it contacts said oil. Oil forced from the reservoir by the injected $CO_2$-rich gas is removed to the surface of the earth without decreasing substantially the reservoir pressure, by way of a producing well. The amount of $CO_2$-rich gas injected into the reservoir is from about 0.2 to 1.0 times the volume occupied by the reservoir oil in that part of the reservoir through which the injected $CO_2$-rich gas stream passes in flowing from the injection well to the production well. When the injected carbon dioxide gas contacts the oil in the reservoir, some of the oil evaporates into the $CO_2$ and simultaneously some of the $CO_2$ dissolves in the oil whereby the viscosities of the two phases approach one another. There is an unexpected increase in the amount of oil recovered and, therefore, a corresponding decrease in the residual oil in the reservoir.

Optionally, an inert fluid such as water or a light liquid hydrocarbon fluid (initial boiling point below 660° F) may be introduced into the injection well either after $CO_2$-rich gas injection or in admixture therewith.

As previously mentioned, the liquid methanol charged with $H_2S$ and any remaining COS leaving from the bottom of the second regeneration column may be introduced into a third regeneration column where, by hot regeneration of methanol, $H_2S$ and any COS are boiled off. However, substantially all of the COS will have been previously reacted in the water-gas shift converter. Thus, the charged methanol is heated to a temperature in the range of about 150° to 250° F, and a pressure in the range of about 10 to 100 psig, and the $H_2S$ and COS are boiled off. The stream of lean methanol may be then cooled to a temperature in the range of about $-50°$ to $-80°$ F and recycled to said acid-gas absorber. Optionally, an additional dehydration still for the lean methanol may be included in the system.

The stream of sulfur-containing gases leaving from the top of the third regeneration column comprises in mole %: $H_2S$ 10-40, COS nil to 3, and $CO_2$ 60-90. This stream of gases may be introduced into a conventional Claus unit where about ⅓ of the initial $H_2S$ is oxidized with air to $SO_2$ in a high temperature burner at about 1832° F. The stoichiometry of the gas stream is then such that the basic reaction, for example, between the remaining $H_2S$ and $SO_2$, is shown in Equation I.

$$2H_2S + SO_2 \rightarrow 3/n\, S_n + 2H_2O \qquad (I)$$

For thermodynamic reasons, the catalytic unit should be operated at as low a temperature as possible above the sulfur dew point, provided the reaction rate is fast enough. Conversion of $H_2S$ over commercial sulfated cobalt-molybdenum (for example, in wt. % 3.0-4.0 CoO; 14.5-16.0 $MoO_3$) decreases with increased temperature, although the reaction rate increases. High $H_2S$ conversions may be obtained at temperatures in the range of about 450° to 540° F. High COS conversions may be obtained at temperatures in the range of about 540° to 675° F and above.

In the next step there may take place final purification of the process gas stream leaving the acid-gas absorption zone to remove carbon monoxide. An $H_2$-rich gas stream substantially comprising 96-99.8 mole % hydrogen may be obtained thereby. Only methane, argon, and nitrogen then remain as impurities in the process gas stream. The concentrations of the $N_2$ and A are usually each well below 0.5 mole % when the free-oxygen containing gas in the gas generation step is substantially pure oxygen containing 98 mole % or more of $O_2$.

Any suitable conventional system employing physical absorption with a liquid solvent may be employed for removing the CO from the effluent gas stream leaving the acid-gas absorption column.

A simplified system for removing CO from the process gas stream by physical absorption in cold copper liquor in a CO absorption column will be described below. Upon applying heat and releasing the pressure on the copper liquor in a copper-liquor regeneration column, a relatively pure carbon monoxide is obtained. The reaction is shown in Equation II.

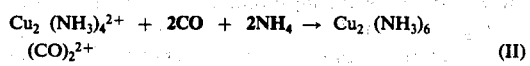

$$Cu_2(NH_3)_4{}^{2+} + 2CO + 2NH_4 \rightarrow Cu_2(NH_3)_6(CO)_2{}^{2+} \qquad (II)$$

Theoretically, one mole of CO should be absorbed per mole of cuprous copper. Preferably, at least a portion of the CO-rich by-product gas stream, comprising, for example, about 70 mole % CO and about 12 mole % $CO_2$, may be mixed with supplemental $H_2O$ if needed, and with at least a portion of the incoming clean feed gas to the system. This gas mixture may be then preferably passed through the water-gas shift converter, as previously described. By this means, the $H_2$ and $CO_2$ content in the process gas stream may be increased.

For example, the effluent gas stream from the acid-gas scrubber may be contacted in a conventional packed or tray-type column with a countercurrent flowing stream of, for example, cuprous acetate dissolved in aqua-ammonia solution.

The temperature is in the range of about 32° to 100° F and the pressure is in the range of about 1000 to 3000 psig. Preferably, by keeping the pressure in the gas generator high enough, a gas compressor may be avoided between the acid-gas absorption column and the CO absorption column.

A typical analysis (by weight %) of the copper-liquor solution may include the following: $Cu^+$ 10; $Cu^{2+}$ 2.2; $CO_3{}^{2-}$ (carbonate) 13.9; $HCO_3{}^-$ (bicarbonate) 1.3; and $NH_4{}^+$ 16.5. The acid radical in the aqueous solution may be either carbonate, formate, or acetate.

Carbon monoxide is absorbed in the copper-liquor solution and, when the oxidant in the gas generator is substantially pure oxygen, a hydrogen-rich product gas is obtained having the following composition in mole %: $H_2$ 96 to 99.8; $CH_4$ nil to 1; A nil to 1; $N_2$ nil to 2.0; $NH_3$ nil to 1; CO nil to less than 10 ppm; $CO_2$ nil to less than 10 ppm; and S nil to less than 1 ppm.

Regeneration of the copper liquor and release of the CO-rich gas stream takes place in a copper-liquor regenerator. The pressure differential between the scrubber and the regenerator is about 1000 to 3000 psi, e.g. 1600 psi.

By the reduction of pressure and the addition of heat and a free-oxygen containing gas, e.g. air, pure $O_2$ and mixtures thereof, the direction of Equation II may be reversed and the carbonate and bicarbonate ions may be regenerated. The normal temperature range in the regenerator may be about 170° to 180° F. Fresh make-up ammonia and, for example, acetic acid may be added to the copper liquor in the regenerator in order to maintain the proper solution chemistry. When the oxidant in the gas generator is substantially pure oxygen, the CO-rich gas may have the following composition in mole %: CO 60 to 95; $N_2$ nil to 20; $CO_2$ 2 to 15; $H_2$ 2 to 8; $CH_4$ nil to 1; $NH_3$ nil to 5; and A nil to 1.

DESCRIPTION OF THE DRAWING

A more complete understanding of the invention may be had by reference to the accompanying schematic drawing which shows an embodiment of the previously described process in detail.

Clean raw synthesis gas feed in line 1 may be produced in a free-flow noncatalytic gas generator (not shown) by the partial oxidation of a hydrocarbonaceous fuel, e.g. high-sulfur petroleum oil with substantially pure oxygen and in the presence of a temperature moderator, e.g. $H_2O$. The effluent gas from the gas generator comprises $H_2$, CO, $CO_2$, $H_2O$, $CH_4$, $N_2$, A, $H_2S$, COS, and entrained particulate carbon. In a conventional gas scrubbing zone (not shown) the entrained particulate carbon is removed from the effluent gas stream leaving the gas generator.

The clean synthesis gas feed in line 1 is passed into water-gas shift converter 2 by way of line 3, valve 4, and lines 5-7. Optionally, supplemental $H_2O$ from line 10 is passed into line 7 where it is mixed with the clean synthesis gas. Optionally, a stream of CO-rich gas from line 15 may be mixed in line 6 with the clean raw synthesis gas from line 5. The CO-rich gas may be obtained subsequently in the process from copper-liquor regeneration column 97. In water-gas shift converter 2, CO and $H_2O$ react over a conventional water-gas shift catalyst to produce additional $H_2$ and $CO_2$. Optionally, at least a portion of the clean raw synthesis gas in line 1 may by-pass the shift converter by way of line 16-17, valve 18, and line 19.

The shifted synthesis gas stream is passed into conventional dryer 20 by way of lines 21 and 22. Shifted gas leaving water-gas shift converter 2 by way of line 21 may be mixed in line 22 with clean raw synthesis gas from line 19. $H_2O$ is removed from the process gas stream in dryer 20, for example, by being cooled below the dew point, and leaves by line 23.

The dry clean process gas stream enters cooler 25 by way of line 26 and is cooled to a temperature below the dew points of $CO_2$, $H_2S$, and COS. Substantial portions of these acid gases in the process gas stream condense out and leave cooler 25 as a liquid mixture by way of line 27. The process gas stream is passed through line 28 into acid-gas absorption column 29 where it passes in contact with a down-flowing lean liquid solvent absorbent such as cold methanol, which enters column 29 through lines 31 and 32.

The rich liquid solvent absorbent, e.g. methanol loaded with acid-gas leaves acid-gas absorption column 29 through lines 33 and 34 and passes respectively into solvent absorbent regeneration columns 35 and 36. Simultaneously, the condensed liquid stream comprising $CO_2$, $H_2S$, and possibly a small amount of COS in line 27 is introduced into column 36. In columns 35 and 36, a $CO_2$-rich gas stream is removed from the rich solvent absorbent to produce a lean solvent absorbent by pressure reduction plus reboiling or gas stripping. Optionally, any $H_2$ may have been first separated from the process gas stream by step-wise pressure reduction and flashing in a separate column (not shown). Thus, rich absorbent in line 33 is passed through line 37 into regeneration column 35 and through line 38 into column 36. Rich absorbent in line 34 is passed through line 39 into regeneration column 36. Lean absorbent leaves from line 40 at the bottom of column 35 and is passed through line 32 into acid-gas absorption column 29. A portion of the lean absorbent may be passed through reboiler 41 by way of lines 42 and 43.

In absorbent regeneration column 36, $CO_2$ may be flashed off and separated from the $H_2S$ and COS which substantially remain dissolved in the solvent absorbent. In another embodiment, all of the $H_2S$ goes off overhead from column 36 in admixture with $CO_2$ and optionally stripping gas.

A purified synthesis gas stream leaves absorption column 29 through line 45 free from acid gas. All or a portion of this product gas stream may leave the system by way of line 46, valve 47, and line 48. Depending on the composition, the gas stream may be used as synthesis gas, reducing gas, or fuel gas.

Preferably, at least a portion, e.g. 1 to 20 volume percent, of the product gas stream in line 45 may be used as stripping gas in absorbent stripping columns 35 and 36. In such case a portion of the gas stream in line 45 is passed into absorbent stripping columns 35 and 36 by way of line 49, 50, valve 51, and lines 52-53. The stripping gas may then enter column 35 by way of line 58 and column 36 through line 54.

Alternately, the stripping gas in absorbent stripping column 36 may comprise a portion of the raw effluent synthesis gas stream from a gas generator (not shown) after entrained particulate carbon is removed by conventional procedures (not shown). In such case, a portion of the gas stream in line 1 is passed through lines 16, 60, valve 61, and line 62. Further, the gases from lines 54 and 62 in any suitable proportions may be used as said stripping gas. Alternately, the stripping gas in absorbent regeneration columns 35 and 36 may include at least a portion of the hydrogen-rich gas made by removing CO from the purified synthesis gas stream in line 45 by physical absorption in an absorbent, to be further described.

A $CO_2$-rich gas stream leaves column 35 by way of line 63. A $CO_2$-rich gas stream also leaves regeneration column 36 by way of line 64. Optionally, at least one of the following gases may be in admixture with this gas stream: stripping gas, $H_2S$, and possibly COS. The gas streams in lines 63 and 64 are mixed together in line 65. In the subject invention, by means of at least one injection well (not shown), the gas stream in line 65 may be introduced into an underground reservoir to facilitate primary, secondary, or tertiary recovery of petroleum oil.

In the preferred embodiment, the operating conditions, e.g. temperature and pressure, of column 36 are such that a $CO_2$-rich gas stream goes overhead from column 36 and is thereby separated from the $H_2S$ and any COS. The solvent absorbent rich in $H_2S$ and any COS leaves stripping column 36 by way of lines 66 and 67 and is introduced into a third absorbent regeneration column 68. A portion of this stream is recycled through reboiler 69 by way of lines 70 and 71. Column 68 is run hot by recycling a portion of the lean absorbent stream which leaves from the bottom of the column by way of line 72 and passes through line 73, reboiler 74, and line 75. The absorbent is heated to its boiling point and desorption of $H_2S$ and any COS takes place in column 68. The gaseous stream comprising $H_2S$, COS and $CO_2$ leaves through line 76 and may be passed into a Claus unit (not shown) where elemental sulfur is produced. A valuable by-product is thereby obtained and atmospheric pollution is prevented.

Lean regenerated solvent absorbent leaves column 68 through line 72 and is recycled to acid-gas absorption column 29 by way of line 80, recycle pump 81, line 82, cooler 83, and line 31.

All or a portion of the acid gas-free effluent gas leaving absorption column 29 may be further purified to produce a stream of $H_2$-rich gas as previously mentioned. For example, substantially all of the CO may be removed from this gas stream by physical absorption in copper-liquor CO absorption column 84.

Thus, the process gas stream in line 45 may be passed through lines 49, 55, valve 56, and lines 57, 86-87 into CO absorption column 84 where it is contacted by a countercurrent stream of lean copper liquor which enters column 84 through line 88. Optionally, if the effluent gas stream from the acid-gas absorption column needs compressing prior to being introduced into CO absorption column 84, it may be passed through lines 55, 57, 77, compressor 78, and lines 79 and 87. CO is absorbed by the copper liquor, and the rich or charged copper liquor leaves column 84 by way of line 89. $H_2$-rich product gas leaves column 84 by way of lines 90-91, valve 92, and line 93. This gas may be used for making ammonia or for hydrogenation processes.

Optionally, at least a portion of the $H_2$-rich gas stream in line 90 may be used as stripping gas in absorbent stripping columns 35 and 36, as previously mentioned. In such case, the $H_2$-rich gas is passed through line 94, valve 95, lines 96, 53, and into 54 and 58. Optionally, as previously mentioned, the stripping gas in column 35 may comprise mixtures of said $H_2$-rich gas with a portion of the acid gas-free product gas from line 52. Further, the stripping gas in column 36 may comprise mixtures of said $H_2$-rich gas with either a portion of the acid gas-free product from line 52, or a portion of clean raw synthesis gas from the gas generator in line 62, or both.

The rich copper liquor leaving CO absorption column 84 by way of line 89 is regenerated in copper-liquor regeneration column 97. A stream of by-product carbon monoxide may be flashed off from the top of column 97 through lines 98-99, valve 100, and line 101 by releasing the pressure, and applying heat and air from line 102. Fresh make-up ammonia may be introduced through line 103, and other make-up chemicals when necessary through line 104. For example, when the solvent absorbent is copper ammonium acetate, make-up acetic acid may be introduced through line 104 when necessary.

The regenerated lean copper liquor leaves column 97 through line 105. A portion of the lean liquor is heated and recycled to column 97 by being circulated through line 106, reboiler 107, and line 108. The remainder of the lean copper liquor is passed through line 88 into CO absorption column 84, as previously described.

The by-product CO-rich gas stream in line 98 may be used in chemical synthesis. Preferably, at least a portion of this CO-rich gas stream may be passed through line 110, valve 111, and line 15 into line 6 where it is mixed with clean raw synthesis gas from line 5. The gas mixture is then introduced into water-gas shift converter 2, where reaction takes place to increase the hydrogen and carbon dioxide content of the process gas stream, as previously described.

EXAMPLES OF THE PREFERRED EMBODIMENTS

The following examples are offered as a better understanding of the present invention, but the invention is not to be construed as limited thereto.

EXAMPLE I

Example I depicts one embodiment of the invention which is useful for increasing the nation's recoverable oil reserves by improving the yield of spent formations.

Synthesis gas is generated in an unpacked free-flow refractory lined reactor by the noncatalytic partial oxidation of petroleum fuel oil with substantially pure oxygen (95 mole % $O_2$ or higher) and steam at an autogenous temperature of about 2500° F and a pressure of about 40 atmospheres. The internal volume of the combustion chamber of the gas generator is 160 cubic feet.

The fuel oil supplied to the synthesis gas generator has the following characteristics:

| | |
|---|---|
| Gravity, ° API | 9.2 |
| Ultimate Analysis, Wt. % | |
| Carbon | 86.6 |
| Hydrogen | 10.4 |
| Sulfur | 1.9 |
| Nitrogen | 0.9 |
| Oxygen | 0.1 |
| Ash | 0.1 |
| Heating Value, BTU/lb. | 18,190 |

The ratio of atoms of oxygen in the free-oxygen containing gas to atoms of carbon in the fuel oil is 0.90. The ratio of pounds of steam to pounds of fuel oil is 0.55.

The effluent gas from the synthesis gas generator is quenched in water in a quench tank and then scrubbed to remove entrained particulate carbon. The clean process gas stream is then passed through a conventional water-gas shift conversion zone to produce a feed gas stream. Run Nos. 1 and 2 below represent two embodiments of the subject process.

Reference is made to the drawing. Clean, dry and shifted synthesis gas as shown in line 26 of the drawing and having the composition shown in Table 1, column 3, below is cooled in cooler 25 and contacted with methanol absorbent in acid-gas absorption column 29 at a temperature of about $-75°$ F and a pressure of about 38 atmospheres. Due to the heat of solution, there is a large temperature gradient in the absorption column. The lean methanol enters at a temperature in the range of about $-70°$ to $-80°$ F and the rich methanol comes out at a temperature in the range of about $-10°$ to $-15°$ F. The composition of product gas leaving absorption column 29 is shown in Table 1, column 4.

A portion of the product gas in line 45 is purified further by removing CO by absorption in copper liquor in absorption column 84. The lean copper liquor enters near the top of the column at a temperature in the range of about 40°-50° F and the rich copper liquor leaves at the bottom of the column at a temperature in the range of about 70°-90° F. The pressure is about 35 atmospheres. It is beneficial to compress the feed gas stream to the copper-liquor absorption column to a higher pressure, e.g. 110 atmospheres, if the $H_2$-rich product gas stream is needed at higher pressures. The composition of said $H_2$-rich gas stream leaving by line 93 is shown in Table 1, column 5.

The rich methanol absorbent charged with acid gas leaving absorption column 29 is regenerated in columns 35 and 36 by dropping the pressure to about 1–2 atmospheres and stripping the charged methanol with about 3–5 standard cubic feet of stripping gas per gallon of rich methanol absorbent. In Run No. 1, the stripping gas comprises a portion of the synthesis gas leaving acid gas absorption column 29 through line 45. In Run No. 2, the stripping gas comprises a portion of the $H_2$-rich product gas leaving CO absorption column 84 through line 90.

The composition of the by-product gas stream comprising a mixture of $CO_2$ and stripping gas leaving absorbent stripping columns 35 and 36 by way of lines 63–65 is shown in Table 1, column 6. Since the stripping gas used in Run. No. 2 has a greater hydrogen content that the stripping gas used in Run. No. 1, the hydrogen content of the by-product gas stream in line 65 for Run No. 2 is greater than that for Run No. 1. However, either or both gas streams may be suitably injected into an underground spent oil reservoir for recovering petroleum oil. The additional hydrogen may be beneficial since it may react with the oil at the conditions under consideration and, by hydrotreating the oil, improve its quality.

Optionally, a portion of the petroleum oil recovered from the underground formation may be introduced into the partial oxidation synthesis gas generator as at least a portion of the feed.

Further, the use of said gas streams, e.g. from lines 45, 90, or mixtures thereof, as stripping gas in the manner previously described is an improvement over the prior art.

In comparison, when an equal amount of 100% nitrogen is used in place of applicants' stripping gas to strip the charged methanol in columns 35 and 36, the composition of the gas stream in line 65 comprises in mole %: $CO_2$ 82.66; $N_2$ 17.08; $H_2$ 0.17; A 0.03; CO 0.05; $CH_4$ 0.01; and $H_2S$ 0.00. However, the high nitrogen content in such a gas stream makes it undesirable for injection into an underground spent oil reservoir since nitrogen is comparatively insoluble in the oil and could cause breakthroughs in the oil formation.

TABLE 1

| | | 3 | | 4 | | 5 | | 6 | |
|---|---|---|---|---|---|---|---|---|---|
| | | Dry, Shifted Gas Feed Stream (Line 26) | | Acid Gas-Free Product Stream (Line 45) | | $H_2$-Rich Product Gas Stream (Line 93) | | By-Product Stream of $CO_2$ and Stripping Gas (Line 65) | |
| 1 Run No. | 2 | Mole % | MSCFH | Mole % | MSCFH | Mole % | MSCFH | Mole % | MSCFH |
| 1 | A | .07 | 2 | .12 | 2 | .09 | 1 | .05 | 0 |
| | $H_2$ | 60.75 | 1449 | 93.68 | 1447 | 99.46 | 1285 | 16.15 | 160 |
| | CO | 3.70 | 88 | 5.72 | 88 | .00 | 0 | .94 | 9 |
| | $CO_2$ | 34.89 | 832 | .00 | 0 | .00 | 0 | 82.64 | 818 |
| | $N_2$ | .16 | 4 | .17 | 3 | .19 | 2 | .16 | 2 |
| | $CH_4$ | .22 | 5 | .31 | 5 | .26 | 3 | .06 | 1 |
| | $H_2S$ | .21 | 5 | .00 | 0 | .00 | 0 | .00 | 0 |
| | | 100.00 | 2385 | 100.00 | 1545 | 100.00 | 1292 | 100.00 | 990 |
| 2 | A | .07 | 2 | .12 | 2 | .09 | 1 | .08 | 1 |
| | $H_2$ | 60.75 | 1449 | 93.68 | 1447 | 99.46 | 1276 | 17.03 | 168 |
| | CO | 3.70 | 88 | 5.72 | 88 | .00 | 0 | .05 | 0 |
| | $CO_2$ | 34.89 | 832 | .00 | 0 | .00 | 0 | 82.62 | 818 |
| | $N_2$ | .16 | 4 | .17 | 3 | .19 | 2 | .16 | 2 |
| | $CH_4$ | .22 | 5 | .31 | 5 | .26 | 3 | .06 | 1 |

TABLE 1-continued

| | | 3 | | 4 | | 5 | | 6 | |
|---|---|---|---|---|---|---|---|---|---|
| | | Dry, Shifted Gas Feed Stream (Line 26) | | Acid Gas-Free Product Stream (Line 45) | | $H_2$-Rich Product Gas Stream (Line 93) | | By-Product Stream of $CO_2$ and Stripping Gas (Line 65) | |
| Run No. | 2 | Mole % | MSCFH | Mole % | MSCFH | Mole % | MSCFH | Mole % | MSCFH |
| | $H_2S$ | .21 | 5 | .00 | 0 | .00 | 0 | .00 | 0 |
| | | 100.00 | 2385 | 100.00 | 1543 | 100.00 | 1282 | 100.00 | 990 |

EXAMPLE II

Example II depicts one embodiment of the invention whereby the hydrogen content of the product and by-product gas streams are increased by recovering CO from the process gas stream and subjecting said CO to the water-gas shift reaction to product additional $H_2$ and $CO_2$.

The subject scheme will enhance the economic attractiveness of the partial oxidation process by increasing the hydrogen yield.

The process gas stream is produced from substantially the same type of petroleum fuel oil as used in Example I. Further, the operating conditions in the partial oxidation gas generator are substantially the same as those in Example I.

Run Nos. 1 and 2 in Table 2 pertain to two embodiments of the subject process which differ solely by the kind of free-oxygen containing gas that is introduced by way of line 102 into copper-liquor regeneration column 97. In Run No. 1, the free-oxygen containing gas is air, whereas in Run No. 2 it is substantially pure oxygen.

After removal of particulate carbon, the clean, raw synthesis gas stream in line 1 has the composition shown in Table 2, column 3. After water-gas shift and drying, the clean, dry, shifted process gas stream has the composition shown in Table 2, column 4. The $CO_2$-rich gas in admixture with stripping gas in line 65 has the composition shown in Table 2, column 5. As previously described, this gas stream may be injected underground to improve the yield of petroleum oil recovered.

The composition of the product gas stream free from acid gas leaving absorption column 29 from line 45 is shown in Table 2, column 6. The CO-rich gas stream removed from copper-liquor regeneration column 97 is shown in Table 2, column 7. The $H_2$-rich gas stream leaving CO absorption column 84 from line 93 is shown in Table 2, column 8.

From Table 2, it is shown that the hydrogen yield from the $H_2$-rich product gas stream (line 93) for Run Nos. 1 and 2 is about 1850 MSCFH. This represents an increased yield of about 4.3%, in comparison with the case where the reject CO-rich stream line 98 is not returned to the water-gas shift converter. While a 4.3% increase in $H_2$ yield may not sound like very much, it has been achieved without any increase in either the oxygen or hydrocarbon charge stock being fed to the gas generator, so that it represents a substantial monetary savings. For example, assuming that hydrogen is valued at $1.00/MSCF, then the annual increase in profits is estimated at about $615,000 for a 2000 MSCFH plant.

Run No. 2 represents the scheme where oxygen is used instead of air to regenerate the spent copper liquor. In such case, the hydrogen concentration in the $H_2$-rich gas stream (line 93) is greater in Run No. 2 than in Run No. 1. Further, the nitrogen concentration in Run No. 2 is less than that in Run No. 1.

TABLE 2

| | | 3 | | 4 | | 5 | | 6 | | 7 | | 8 | |
|---|---|---|---|---|---|---|---|---|---|---|---|---|---|
| | | Clean Process Feed Gas Stream (Line 1) | | Dry, Shifted Gas Feed Stream (Line 26) | | By-Product Stream of $CO_2$ & Stripping Gas (Line 65) | | Acid Gas-Free Product Stream (Line 45) | | By-Product CO-Rich Stream (Line 98) | | $H_2$-Rich Product Gas Stream (Line 90) | |
| Run No. | 2 | Mole % | MSCFH | Mole % | MSCFH | Mole % | MSCFH | Mole % | MSCFH | Mole % | MSCFH | Mole % | MSCFH |
| 1 | A | .06 | 3 | .11 | 4 | .01 | 2 | .18 | 4 | .39 | 1 | .14 | 3 |
| | $H_2$ | 19.50 | 1054 | 61.27 | 2080 | 16.03 | 220 | 93.19 | 1860 | 3.92 | 6 | 98.16 | 1854 |
| | CO | 19.39 | 1048 | 3.33 | 113 | .94 | 13 | 5.02 | 100 | 55.59 | 85 | .00 | 0 |
| | $CO_2$ | 2.22 | 120 | 34.02 | 1155 | 82.71 | 1135 | .00 | 0 | 9.80 | 15 | .00 | 0 |
| | $N_2$ | .13 | 7 | .94 | 32 | .29 | 4 | 1.42 | 28 | 16.36 | 25 | 1.50 | 28 |
| | $CH_4$ | .07 | 4 | .12 | 4 | .02 | 0 | .19 | 4 | .00 | 0 | .20 | 4 |
| | $H_2S$ | .13 | 7 | .21 | 7 | .00 | 0 | .00 | 0 | .00 | 0 | .00 | 0 |
| | $NH_3$ | .00 | 0 | .00 | 0 | .00 | 0 | .00 | 0 | 3.27 | 5 | .00 | 0 |
| | $H_2O$ | 58.50 | 3163 | | | | | | | 10.67 | 16 | | |
| | | 100.00 | 5406 | 100.00 | 3395 | 100.00 | 1372 | 100.00 | 1996 | 100.00 | 153 | 100.00 | 1889 |
| 2 | A | .06 | 3 | .09 | 3 | .01 | 0 | .13 | 3 | .04 | 0 | .14 | 3 |
| | $H_2$ | 19.50 | 1054 | 61.74 | 2080 | 16.25 | 223 | 94.33 | 1857 | 4.77 | 6 | 99.32 | 1851 |
| | CO | 19.39 | 1048 | 3.35 | 113 | .95 | 13 | 5.07 | 100 | 68.45 | 85 | .00 | 0 |
| | $CO_2$ | 2.22 | 120 | 34.28 | 1155 | 82.70 | 1135 | .00 | 0 | 12.04 | 15 | .00 | 0 |
| | $N_2$ | .13 | 7 | .21 | 7 | .07 | 1 | .27 | 5 | .00 | 0 | .34 | 6 |
| | $CH_4$ | .07 | 4 | .12 | 4 | .02 | 0 | .20 | 4 | .00 | 0 | .20 | 4 |
| | $H_2S$ | .13 | 7 | .21 | 7 | .00 | 0 | .00 | 0 | .00 | 0 | .00 | 0 |
| | $NH_3$ | .00 | 0 | .00 | 0 | .00 | 0 | .00 | 0 | 4.03 | 5 | .00 | 0 |
| | $H_2O$ | 58.50 | 3163 | | | | | | | 10.67 | 13 | | |
| | | 100.00 | 5406 | 100.00 | 3369 | 100.00 | 1372 | 100.00 | 1969 | 100.00 | 124 | 100.00 | 1865 |

The process of the invention has been described generally and by examples with reference to an oil feedstock of particular composition for purposes of clarity and illustration only. It will be apparent to those skilled in the art from the foregoing that various modifications of the process and the materials disclosed herein can be made without departure from the spirit of the invention.

We claim:

1. A process of purifying a raw synthesis gas stream comprising $H_2$, CO, $H_2O$, $CO_2$, $H_2S$. COS, particulate carbon, and optionally $CH_4$, $N_2$ and A and producing a by-product stream of $CO_2$-rich gas for injection into an underground oil reservoir to effect secondary or tertiary recovery of oil comprising:

1. cooling said raw synthesis gas stream and removing said particulate carbon therefrom by contacting with water;
2. introducing the clean gas stream from (1) into a water-gas shift conversion zone in admixture with supplemental $H_2O$ and reacting together a portion of the CO and $H_2O$ in said shift conversion zone to produce additional $H_2$ and $CO_2$;
3. drying the process gas stream, cooling, and separating from said process gas stream about 0 to 70 volume % of the $CO_2$, $H_2S$, and COS;
4. contacting the process gas stream from (3) in an acid-gas absorption zone with a first liquid solvent absorbent to produce a rich first liquid solvent absorbent containing substantially all of the remaining $CO_2$, $H_2S$, and COS, and a product stream of purified synthesis gas comprising $H_2$, CO, and optionally $CH_4$, $N_2$ and A;
5. regenerating said rich first liquid solvent absorbent in a first absorbent regeneration zone by removing a $CO_2$-rich gas stream by the combination of stripping with a stripping gas selected from the group consisting of: (a) a portion of said raw synthesis gas, (b) a portion of the product stream of purified synthesis gas from (4), (c) a portion of a $H_2$-rich gas stream, and (d) mixtures of (a), (b) and (c); and at least one of the following: flashing, heating;
6. introducing at least a portion of said $CO_2$-rich gas stream in admixture with said stripping gas from (5) into a subterranean formation to effect secondary or tertiary recovery of oil.

2. The process of claim 1 wherein said stripping gas comprises a portion of the purified synthesis gas from step (4) and is introduced into said first absorbent regeneration zone; and said stripping gas in admixture with said $CO_2$-rich gas stream is removed from said first absorbent regeneration zone and is introduced into said subterranean formation in step (6).

3. The process of claim 1 wherein $H_2S$-rich gas and stripping gas are removed in admixture with said $CO_2$-rich gas from the first absorbent regenerating zone in step (5).

4. The process of claim 1 provided with the added steps of heating said first liquid solvent absorbent from step (5) in a second absorbent regeneration zone; removing an $H_2S$-rich gas stream; and producing a clean first liquid solvent absorbent which is recycled to said acid-gas absorption zone in (4) as at least a portion of said first liquid solvent absorbent.

5. The process of claim 4 with the added step of introducing said $H_2S$-rich gas stream into a Claus Unit to produce elemental sulfur.

6. The process of claim 1 provided with the additional steps of contacting purified synthesis gas stream from step (4) with a lean second liquid solvent absorbent in a second solvent absorption zone; removing a stream of $H_2$-rich gas, and a stream of rich second liquid solvent absorbent from said second absorption zone; regenerating said rich second liquid solvent absorbent in a second solvent regeneration zone; removing a stream of CO-rich gas and a stream of lean second liquid solvent absorbent from said second solvent regeneration zone; and recycling said stream of lean second liquid solvent absorbent to said second absorption zone.

7. The process of claim 6 wherein at least a portion of said CO-rich gas stream is introduced into said water-gas shift conversion zone.

8. The process of claim 6 wherein said second liquid solvent absorbent is an aqueous solution of copper ammonium acetate.

9. The process of claim 1 provided with the additional step of introducing a portion of the recovered oil into a partial oxidation generator as at least a portion of the hydrocarbonaceous feed to produce said raw synthesis gas.

10. The process of claim 1 wherein said first liquid solvent absorbent is selected from the group consisting of methanol, N-methyl-pyrrolidone, and dimethyl ether of polyethylene glycol.

11. The process of claim 1 wherein said raw feed gas is produced by the partial oxidation of a hydrocarbonaceous feed at a temperature in the range of about 1300° to 3500° F and a pressure in the range of about 3 to 250 atomspheres absolute.

12. The process of claim 11 wherein at least a portion of said hydrocarbonaceous feed is selected from the group consisting of petroleum distillate and residua, gas oil, fuel oil, residual fuel, reduced crude, whole crude, asphalt, coal tar, coal oil, shale oil, tar sand oil, and mixtures thereof.

13. The process of claim 11 wherein at least a portion of said hydrocarbonaceous feed comprises a pumpable slurry of solid carbonaceous fuels selected from the group consisting of coal, coal char, particulate carbon, petroleum coke, and mixtures thereof, in $H_2O$ or in a liquid hydrocarbonaceous fuel.

14. The process of claim 11 wherein at least a portion of said hydrocarbonaceous feed comprises a liquid hydrocarbon material containing combined oxygen selected from the group consisting of alcohols, ketones, aldehydes, organic acids, esters, ethers, and mixtures thereof, optionally in admixture with a liquid petroleum material.

15. A process for producing a hydrogen-rich gas stream comprising:

1. reacting a hydrocarbonaceous feed by partial oxidation with a free-oxygen containing gas in the presence of a temperature moderator in the reaction zone of a free-flow synthesis gas generator at a temperature in the range of about 1300° to 3500° F and a pressure in the range of about 3 to 250 atmospheres to produce a raw feed gas stream comprising $H_2$, CO, $CO_2$, $H_2O$, $H_2S$, COS, particulate carbon, and optionally $CH_4$, $N_2$ and A;
2. removing said particulate carbon from said raw feed gas stream in a gas scrubbing zone;
3. mixing supplemental $H_2O$ and a by-product CO-rich gas stream as produced subsequently in the process with the clean feed gas stream from (2) and introducing the mixture into a water-gas shift conversion zone, and reacting CO and $H_2O$ in said shift conversion zone to produce $H_2$ and $CO_2$;
4. drying and cooling the process gas stream from (3) to condense out and separate a portion of the $H_2O$, $CO_2$, $H_2S$, and COS;
5. contacting the process gas stream from (4) in an acid-gas absorption zone with a first liquid solvent absorbent which absorbs the remaining portion of said $H_2O$, $CO_2$, $H_2S$, and COS, thereby producing a rich first liquid solvent absorbent and a dry gas stream free from acid gas;

6. contacting the dry acid gas-free process gas stream leaving (5) in a CO-absorption zone with a second liquid solvent absorbent which absorbs substantially all of the remaining CO in said process gas stream and producing said $H_2$-rich product gas stream;
7. regenerating said second liquid solvent absorbent to produce a lean solution of said second liquid solvent absorbent and said by-product CO-rich gas stream;
8. recycling said CO-rich gas stream to (3) as previously described; and
9. recycling said lean solution of second liquid solvent absorbent to the CO absorption zone in (6).

16. The process of claim 15 provided with the additional steps of regenerating said rich first liquid solvent absorbent from step (5) in a regeneration zone by flashing plus stripping with a portion of said dry acid gas-free gas stream from step (5), thereby producing a first liquid solvent absorbent containing $H_2S$ and optionally COS, and a gaseous stream comprising $CO_2$-rich gas in admixture with said stripping gas; regenerating said first liquid solvent absorbent by boiling to produce an $H_2S$-rich stream and a lean first liquid solvent absorbent stream; recycling said lean first liquid solvent stream to step (5), and introducing said $H_2S$-rich stream into a sulfur recovery zone; introducing said gaseous stream comprising $CO_2$-rich gas in admixture with stripping gas into a subterranean formation to facilitate the secondary recovery of oil; and introducing a portion of said recovered oil into the reaction zone of said gas generator as at least a portion of said hydrocarbonaceous feed.

17. The process of claim 15 provided with the additional steps of regenerating said rich first liquid solvent from step (5) in a regeneration zone by a combination of flashing plus reboiling, thereby producing a gaseous stream comprising a $CO_2$-rich gas, a separate gaseous stream comprising an $H_2S$-rich gas, and a lean first liquid solvent stream; recycling said lean first liquid solvent to said acid-gas absorption zone; introducing said $CO_2$-rich gas into a subterranean formation to facilitate the secondary recovery of a hydrocarbonaceous material; and introducing said recovered hydrocarbonaceous material into the reaction zone of said gas generator as at least a portion of said hydrocarbonaceous feed.

18. The process of claim 15 wherein a gaseous stream comprising a mixture of $CO_2$-rich gas and $H_2S$-rich gas is produced by regenerating said rich first liquid solvent; and said gaseous stream is introduced into said subterranean formation to facilitate the secondary recovery of said hydrocarbonaceous material.

19. In a process for producing synthesis gas, hydrogen-rich gas, and by-product $CO_2$-rich gas by reacting a hydrocarbonaceous feed by partial oxidation with a free-oxygen containing gas optionally in the presence of a temperature moderator in the reaction zone of a free-flow gas generator at a temperature in the range of about 1300° to 3500° F. and a pressure in the range of about 1 to 250 atmospheres to produce an effluent gas stream; cooling said effluent gas stream and removing particulate carbon therefrom thereby producing a clean process gas stream comprising $H_2$, CO, $CO_2$, $H_2O$, $H_2S$, COS and optionally $CH_4$, $N_2$, and A; introducing said clean, feed gas stream containing supplemental water into a water-gas shift reaction zone and reacting CO and $H_2O$ to produce $H_2$ and $CO_2$; and removing $CO_2$, $H_2S$ and COS in an acid-gas absorption zone with a first liquid solvent absorbent, thereby producing a rich first liquid solvent absorbent and a dry product gas stream free from acid gas; the improvement comprising:

1. contacting at least a portion of said dry acid gas-free product gas in a CO-absorption zone with a second solvent absorbent which absorbs substantially all of the remaining CO in said process gas stream, and thereby producing said $H_2$-rich product gas stream;
2. regenerating said second liquid solvent absorbent to produce a lean solution of said second liquid solvent absorbent and a by-product CO-rich gas stream;
3. recycling said CO-rich gas stream to said water-gas shift conversion zone to produce additional hydrogen;
4. recycling at least a portion of said lean solution of second liquid solvent absorbent to the CO absorption zone in (1);
5. regenerating a portion of said first liquid solvent absorbent in a regeneration zone by flashing, boiling, and stripping with a stripping gas obtained from within the process and selected from the group consisting of a portion of said clean process gas stream, a portion of said dry product gas stream free from acid gas, and a portion of said $H_2$-rich product gas stream, thereby producing a gaseous by-product stream comprising $CO_2$-rich gas in admixture with said stripping gas, and a first liquid absorbent containing $H_2S$ and optionally COS;
6. boiling the first liquid solvent absorbent leaving (5) to produce an $H_2S$-rich stream and a lean first liquid solvent absorbent stream;
7. recycling said lean first liquid solvent stream to said acid-gas absorption zone; and introducing said $H_2S$-rich stream into a sulfur recovery zone;
8. introducing said gaseous by-product stream comprising $CO_2$-rich gas in admixture with stripping gas from (5) into a subterranean formation to facilitate the recovery of oil; and
9. introducing a portion of said recovered oil into the reaction zone of said gas generator as at least a portion of said hydrocarbonaceous feed.

* * * * *